United States Patent [19]

Smilgys

[11] 3,934,491

[45] Jan. 27, 1976

[54] SETTABLE VARIATOR DRIVE MECHANISM

[75] Inventor: Bruno S. Smilgys, Hartford, Conn.

[73] Assignee: Veeder Industries, Inc., Hartford, Conn.

[22] Filed: Aug. 29, 1974

[21] Appl. No.: 501,852

[52] U.S. Cl. ..................... 74/681; 74/348

[51] Int. Cl.[2] ..................... F16H 37/06

[58] Field of Search ...... 74/681, 348, 665 A, 665 B; 192/12 BA, 41 S, 81 R, 81 C, 48.9, 48.91, 48.92

[56] References Cited

UNITED STATES PATENTS 3,675,848 7/1972 Devanney ..................... 74/681 X

*Primary Examiner*—Samuel Scott
*Assistant Examiner*—Frank H. McKenzie, Jr.
*Attorney, Agent, or Firm*—Prutzman, Hayes, Kalb & Chilton

[57] ABSTRACT

A fuel delivery pump with a settable price variator with a center shaft driven by a fuel meter, volume counters driven by the variator center shaft for registering the volume of fuel delivered and cost counters for registering the cost of fuel delivered driven via a dual input drive transmission having inputs connected to the variator center shaft and to the output of the settable price gearing of the variator and operative to reduce the torque load on the settable price gearing.

15 Claims, 3 Drawing Figures

SETTABLE VARIATOR DRIVE MECHANISM

SUMMARY OF THE INVENTION

The present invention relates generally to settable mechanical variators, for example, of the type conventionally employed in gasoline dispensing apparatus and having settable gearing for establishing the unit volume price of fuel and connected for driving the cost counters of the gasoline dispensing apparatus for registering the cost of the fuel delivered in accordance with the volume delivered and the unit volume price established by the setting of the variator gearing, and relates more particularly to a new and improved settable variator drive mechanism having notable use in gasoline dispensing apparatus for driving the cost counters of the dispensing apparatus with a lower torque load on the settable variator gearing.

The conventional mechanical computer employed in gasoline dispensing apparatus incorporates a mechanical register having a pair of counters on each of two opposite faces of the register for registering, on each of the two opposite faces, the cost and volume of fuel delivered. Such a register is shown and described in U.S. Pat. No. 2,814,444 of Harvey N. Bliss dated Nov. 26, 1957 and entitled "Register." The gasoline pump computer also conventionally incorporates a mechanical price variator of the type shown and described in U.S. Pat. No. 3,413,867 of Richard B. Hamlin dated Dec. 3, 1968 and entitled "Variator", for establishing and posting the unit volume price of the fuel. The variator has a center shaft connected for being mechanically driven by a gasoline meter, and the variator center shaft is connected for driving the volume counters of the register for registering the the volume of fuel delivered. The price variator has settable gearing for establishing the unit volume price of the fuel, and the output of the settable gearing is connected for driving the cost counters of the register to register the cost of fuel delivered in accordance with the volume of fuel delivered and the unit volume price established by the setting of the variator gearing.

Because of the rapidly increasing price of gasoline and concomitant higher drive ratio setting of the variator gearing and increased rate of rotation of the cost counter and variator gearing for any given volume rate of delivery of gasoline, a greater torque load is transmitted through the variator gearing for driving the cost counters causing increased gear loading, gear wear and gear failure. It is, therefore, a principal aim of the present invention to provide a new and improved price variator drive mechanism for gasoline dispensing apparatus for driving the gasoline pump cost counters in a manner providing reduced torque load on the settable variator gearing and therefore reduced gear tooth loading, gear wear and gear failure.

It is another aim of the present invention to provide a new and improved settable variator drive mechanism of the type having settable variator gearing for establishing the variator drive ratio providing reduced torque load on the settable variator gearing.

It is a further aim of the present invention to provide a new and improved settable variator of the type described having a design permitting the variator to be compactly made and the variator gearing to be constructed out of plastic or other materials facilitating economical construction.

It is another aim of the present invention to provide a new and improved settable variator drive mechanism of the type described providing a long service-free life.

It is a further aim of the present invention to provide a new and improved settable variator drive mechanism for driving the cost counters of fuel dispensing apparatus which reduces inertiacaused overtravel and resulting counting inaccuracy of the cost counters at the end of a fuel delivery.

Other objects will be in part obvious and in part pointed out more in detail hereinafter.

A better understanding of the invention will be obtained from the following detailed description and the accompanying drawings of illustrative applications of the invention.

DESCRIPTION OF THE PREFERRED EMBODIMENTS

Figure 1:
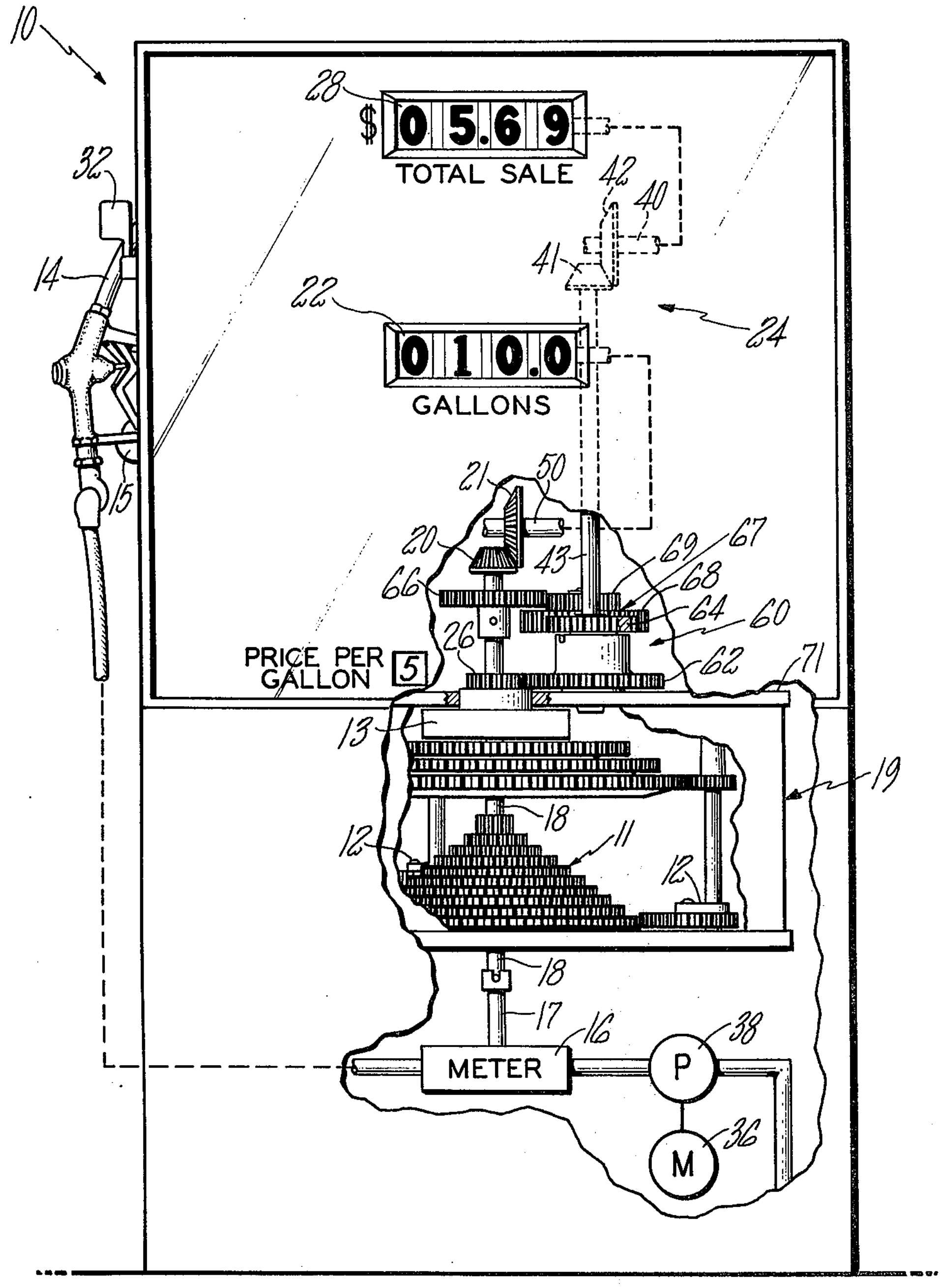
FIG. 1 is a generally diagrammatic front elevation view, partly broken away and partly in section, of a fuel delivery pump incorporating a variator drive mechanism in accordance with the present invention.

Referring now to the drawings in detail wherein like reference numerals indicate like parts throughout the several figures, a fuel delivery pump 10 incorporating an embodiment of a variator drive mechanism of the present invention is shown having a nozzle 14 for delivering fuel and a suitable nozzle storage receptacle 15 for storing the nozzle 14 between fuel deliveries. In a conventional manner, a meter 16 provided in the fuel delivery conduit has a rotary output shaft 17 rotated in accordance with the volume of fuel delivered. The meter shaft 17 is suitably coupled for driving a center shaft 18 of a price variator 19. The price variator 19 may, for example, be of the type described in the aforementioned U.S. Pat. No. 3,413,867 and employs a cone gear 11 on the variator center shaft 18 and three settable range arms 12 which can be selectively manually set into engagement with the gears of the cone gear 11 or in engagement with a respective fixed locking element (not shown) to establish the variator price gear ratio and thereby the desired unit volume price of fuel within a three place unit volume price range. The variator center shaft 18 extends through the variator and is connected via a rotary drive train including bevel gears 20, 21 for driving the usual pair of rotary volume counters 22 of a resettable register 24 of the fuel pump for registering the volume of fuel dispensed.

A variator output gear 26 of the variator is rotatably mounted on the variator center shaft 18 and is driven by the meter 16 via the variator center shaft 18, cone gear 11, the settable variator range arms 12 and range arm summation gearing 13 and therefore in accordance with the unit volume price established by the variator gear ratio setting. The variator output gear 26 is connected (as hereinafter more fully described) to the usual pair of rotary cost counters 28 of the register 24 so that the cost counters 28 register the cost of fuel dispensed in accordance with the volume of fuel dispensed and the unit volume price established by the setting of the price variator 19.

The resettable register 24 may, for example, be of the type shown in the aforementioned U.S. Pat. No. 2,814,444 and is operable by a control handle 32 positioned adjacent the storage receptacle 15 such that the handle 32 has to be rotated to its vertical or "off" position to permit the nozzle to be placed in its storage receptacle at the completion of a fuel delivery, and the nozzle has to be removed from its storage receptacle to permit the handle 32 to be rotated to its horizontal or "on" position. Rotation of the handle 32 to its horizontal or "on" position provides for sequentially disengaging the cost and volume counters 28, 22 from their respective rotary drive trains, resetting the cost and volume counters and then re-engaging the cost and volume counters to their respective rotary drive trains. The register 24 is also connected in a known manner to provide for de-energizing a motor 36 for the usual fuel pump 38 when the handle 32 is turned to its "off" position and for re-energizing the motor 36 after the volume and cost counters 22, 28 of the register 24 have been reset and their rotary drive trains have been re-engaged for driving the cost and volume counters.

The register drive train to the cost counters 28 comprises in a conventional manner a horizontal cost center shaft 40 driven via suitable bevel gearing 41, 42 by a vertical cost shaft 43. Gears (not shown) at opposite ends of the horizontal cost center shaft 40 are connected for driving the lowest order counter wheels of the cost counters 28. In a similar and conventional manner, and lower horizontal volume center shaft 50 is connected to drive the pair of volume counters 22.

In accordance with the present invention, a dual input cost counter drive mechanism 60 is provided in the drive train between the variator 19 and the cost counters 28. A first or primary drive or control gear 62 of the dual input drive mechanism 60 is rotatably mounted on the vertical cost shaft 43 for engagement with the variator output gear 26. A secondary drive gear 64 is rotatably mounted on the vertical cost shaft 43 above the primary gear 62 and is connected to be directly driven by the variator center shaft 18 in the same angular direction as the primary gear 62. More particularly, the secondary drive gear 64 is driven by the price variator center shaft 18 via a gear 66 mounted on the center shaft 18 and an intermediate compound gear 67 having gears 68, 69 engaging the gears 64, 66 respectively. The compound gear 67 is rotatably mounted on an upstanding fixed stub shaft 70 suitably mounted on the top 71 of the price variator 19.

The drive ratio from the center shaft 18 to the secondary drive gear 64 is established to provide that the secondary drive gear 64 rotates at a rate greater than the rate of rotation of the primary gear 62 at all variator settings (and therefore at a rate greater than the rate of the primary gear 62 at the maximum available unit volume price setting of the variator). Alternatively, if desired, manually settable gearing (not shown, but, for example, which is axially shiftable on the price variator center shaft 18 and/or stub shaft 70 and/or cost shaft 43) could be manually set in accordance with the variator setting for selectively driving the secondary drive gear 64 and whereby for the selected variator setting, the secondary drive gear 64 is driven at a rate of rotation slightly greater (e.g., 10 percent greater) than the rate of rotation of the primary gear 62.

The dual input drive mechanism 60 further comprises a first lower cylindrical drum 72 fixed to the vertical cost drive shaft 43 and a second upper cylindrical drum 74 depending from the secondary drive gear 64 and rotatably mounted on the vertical cost shaft 43. The upper drum 74 and secondary gear 64 are axially retained on the vertical cost shaft 43 with the upper drum 74 in contiguous association with the lower drum 72 by a retaining ring 75 and washer 76 mounted on the shaft 43. A helical coil torsion spring 78 is mounted to encircle the coaxial drums 72, 74 between the axially spaced primary and secondary gears 62, 64 respectively, and such that the helical coil spring 78 is axially retained in place between the drive gears 62, 64. Also, an outer coaxial internal cylindrical drum 80 is provided on the primary gear 62 to surround and substantially entirely enclose the coil spring 78.

The helical coil spring 78 has a radially inwardly extending lower end 86 received within an axial slot 88 in the lower drum 72 and a radially outwardly extending upper end 90 received within an axial slot 92 in the outer drum 80. Accordingly, the primary gear 62 is positively connected to the vertical cost shaft 43 via the torsion spring 78. The drive gear 62 is, however, capable of rotating relative to the vertical cost shaft 43 since the torsion spring 78 provides an angularly flexible drive coupling between the gear 62 and shaft 43. The coil spring 78 is coiled to extend helically from its upper end 90 in the opposite angular direction to the direction of rotation of the gears 62, 64, and vertical cost shaft 43 and such that the coil spring 78 contracts as the primary gear 62 rotates forwardly relative to the vertical cost shaft 43 and the coil spring 78 expands as the vertical cost shaft 43 rotates forwardly relative to the primary gear 62. Thus, the angular displacement of the primary gear 62 relative to the vertical cost shaft 43 is limited in the forward angular direction by the contraction of the torsion spring 78 into engagement with the inner drums 72, 74 and in the opposite angular direction by the expansion of the torsion spring into engagement with the internal cylindrical drum 80.

Figure 2:
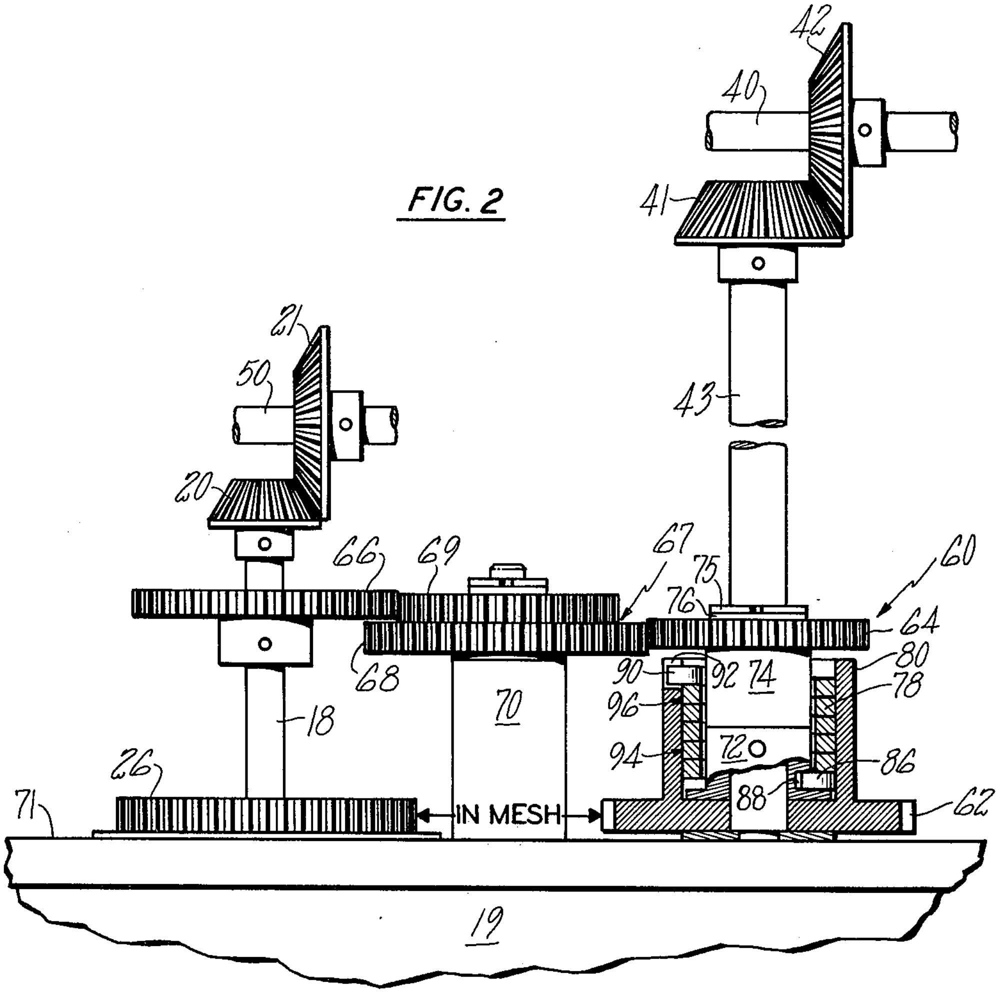
FIG. 2 is an enlarged partial elevation view, partly broken away and partly in section, of the variator drive mechanism.

Referring to the embodiment of FIG. 2, the helical coil spring 78 has a first lower multiple-coil spring section 94 with a plurality of coils closely surrounding the lower drum 72. The helical coil spring 78 has a second upper multiple-coil spring section 96 (having, for example, approximately the same number of coils as the lower spring section 94) closely surrounding the upper drum 74. The helical coil spring 78, in its undisplaced condition, has an inner diameter which is very slightly greater than the diameter of the drums 72, 74. Also, in the undisplaced condition of the coil spring 78, the outer diameter of the coil spring may be slightly less than the diameter of the internal drum 80, in which case the coil spring 78 is also in an unstressed condition. Alternatively, the coil spring 78 may be held in its undisplaced condition in a partly contracted stressed condition by the internal drum 80. In either case, the coils of the torsion spring 78 are substantially out of frictional engagement with the drums 72, 74 with the torsion spring 78 in its normal or undisplaced condition and are adapted to be contracted onto the drums 72, 74 by forward rotation of the primary gear 62 relative to the vertical cost shaft 43. In the embodiment of FIG. 2, the upper spring section 96 surrounding the upper drum 74 is preferably angularly contracted into effective frictional engagement with the drum 74 within a few degrees of forward angular displacement of the primary drive gear 62 relative to the vertical cost shaft 43 and, for example, if desired, even before the torsion spring 78 is torsionally loaded sufficiently to drive the vertical cost shaft 43, it being seen that such torsional spring loading is dependent on the spring rate and the number of spring coils which are subject to being contracted and expanded by the relative angular displacement of the primary gear 62 and vertical cost shaft 43.

Figure 3:
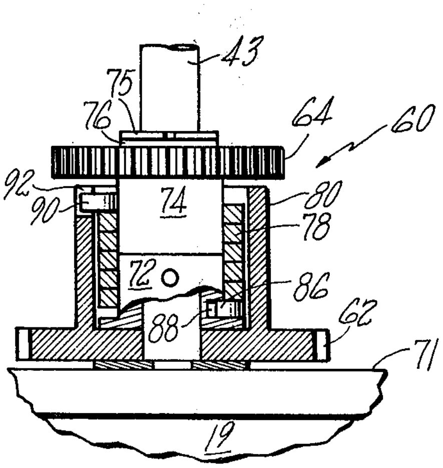
FIG. 3 is an enlarged partial elevation view, partly broken away and partly in section, of a modified variator drive mechanism in accordance with the present invention.

In the embodiment of the dual drive mechanism 60 shown in FIG. 3, the torsion spring 78 has an unstressed diameter less than the drums 72, 74 and such that in its undisplaced condition it frictionally engages the drums 72, 74. The internal cylindrical drum 80 of the primary drive gear 62 has a diameter for retaining the torsion spring 78 against undue expansion and such that a few degrees of forward rotation of the vertical cost shaft 43 relative to the primary drive gear 62 will expand the spring 78 out of effective frictional engagement with the upper drum 74 and then subsequently into frictional engagement with the outer cylindrical drum 80.

In both embodiments of FIGS. 2 and 3, the helical coil spring 78 is preferably formed of wire having a square cross section as shown and preferably so that each coil of wire has a flat area of contact with the friction drums 72, 74, 80.

During the delivery of fuel, the vertical cost shaft 43 will, through the contracting engagement of the spring coils with the upper friction drum section 74, be torsionally driven at least in part via the drum 74 by the price variator center shaft 18. The price variator center shaft 18 therefore assists in directly driving the vertical cost shaft 43 by an amount established by the selection of a spring 78 having the desired spring rate, number of coils, and an unstressed diameter relative to the diameters of the drums 72, 74 and 80.

For example, in the embodiment of FIG. 2, a spring could be selected so that the upper secondary drum 74 is effective in delivering a share of the required torque load for driving the cost counters 28 at a very low initial RPM level of the vertical cost shaft 43 (e.g., 5 percent of the maximum RPM of the cost shaft 43) and therefore at a low required torque level. As the RPM of the vertical cost shaft 43 increases beyond that initial RPM level as the rate of the delivery of fuel increases, the secondary drum 74 delivers an increasing share of the required torque until the drum 74 delivers substantially all of the increased torque above a determinable torque or RPM level. That level can be established as desired by the selection of the torsion spring 78 and whereby a maximum torque transmitted via the variator gearing to the vertical cost shaft 43 can be established. Accordingly, even at high unit volume price settings of the variator 19 and high fuel delivery rates, the torque transmitted via the variator gearing to the vertical cost shaft 43 can be held to within acceptable limits. Accordingly, gear tooth loading, gear wear and gear failure can be substantially reduced, the gears can be made smaller and the gears can be made out of plastic or other materials permitting economies of manufacture and a more compact assembly.

In the embodiment of FIG. 3, a torsion spring 78 can be selected so that the torsion spring is preloaded sufficiently to permit the secondary drum 74 to provide all of the required torque for driving the vertical cost shaft 43 throughout part or the entire RPM operating range of the vertical cost shaft 43. During such operation, the friction drum 74 in effect drives the gear 62 and all or part of the remaining gears of the variator price setting gearing and whereby the opposite edges of the gear teeth of such gears are operative. Accordingly, there is no available forward play or backlash in the variator gear train which permits the cost counters to overtravel at the end of a fuel delivery due to inertia. Such inertia-caused overtravel of the cost counters is discussed in my copending U.S. Pat. application Ser. No. 432,577 filed Jan. 11, 1974 and entitled "Rotary Drive Anti-backlash Device."

As will be apparent to persons skilled in the art, various modifications, adaptations and variations of the foregoing specific disclosure can be made without departing from the teachings of the present invention.

I claim:

1. In a settable price variator drive train for a fluid delivery system for setting the unit volume price of the fluid delivered, comprising a price variator with a rotary input adapted to be rotated in accordance with the volume of fluid delivered, a rotary output, and gear means interconnecting the price variator input and output having settable price gear means settable for establishing the drive ratio between the variator input and output for establishing the unit volume price of the fluid, and a rotary drive mechanism for connecting the variator for registering the cost of fluid delivered in accordance with the volume of fluid delivered and the unit volume price established by the setting of the price gear means, the improvement wherein the rotary drive mechanism comprises a rotary drive output adapted to be connected for registering the cost of fluid delivered and first and second rotary inputs respectively connected for being driven by the variator output and by the variator input bypassing the settable price gear means, and selectively engageable intermediate drive control means controlled by said first rotary input for selectively connecting said second rotary input for rotating the rotary drive output in accordance with the rotation of said first rotary input whereby at least part of the torque load on the rotary drive output is transmitted thereto from the variator input via said second rotary input and bypassing the settable price gear means.

2. A settable price variator drive train according to claim 1 wherein said rotary drive output and said first and second rotary inputs are coaxial and said second rotary input is driven by the variator input in the same angular direction as and at a rate of rotation greater than said first rotary input.

3. A settable price variator drive train according to claim 1 wherein the selectively engageable intermediate drive control means comprises selectively engageable clutch means engageable for coupling said second rotary input to said rotary drive output, the clutch means being connected to said first rotary input for being selectively engaged thereby for rotation of said rotary drive output in accordance with the rotation of said first rotary input.

4. A settable price variator drive train according to claim 1 wherein the selectively engageable intermediate drive control means comprises selectively engageable friction clutch means operable by said first rotary input for selectively frictionally coupling said second rotary input to said rotary drive output.

5. A settable price variator drive train according to claim 1 wherein said first rotary input and said rotary drive output are coaxial and wherein the intermediate drive control means comprises a torsion spring coupling said first rotary input to said rotary drive output and permitting relative angular displacement therebetween.

6. A settable price variator drive train according to claim 5 wherein the torsion spring is a generally helical coil spring generally coaxial with said first rotary input and said rotary drive output and having a first end connected to said first rotary input and a secondary end connected to said rotary drive output.

7. A settable price variator drive train according to claim 6 wherein the intermediate drive control means comprises a friction drum coaxial with and engageable by said generally helical coil spring and connected to be driven by said second rotary input, the coil spring and friction drum providing selectively engageable clutch means operable by said relative angular displacement between said first rotary input and said rotary drive output for selectively coupling said second rotary input to said rotary drive output.

8. A settable price variator drive train according to claim 1 wherein the intermediate drive control means is operative for coupling said second rotary input to said rotary drive output for transmitting substantially the entire torque load on said rotary drive output at least above a predetermined speed of the variator output from said variator input via said second rotary input bypassing the settable price gear means.

9. A settable price variator drive train according to claim 1 wherein the intermediate drive control means is operative for connecting said second rotary input for rotating said first rotary input and said variator output and at least part of the variator gear means at least at above a predetermined speed of the variator output to remove at least part of the overtravel backlash in the variator gear means above said predetermined speed.

10. A settable price variator drive train according to claim 2 wherein the intermediate drive control means comprises a rotatable drum affixed to said second rotary input having an annular friction surface coaxial therewith, and a generally helical coil spring generally coaxial with the rotatable drum having a friction spring section with a plurality of generally helical friction coils each adapted for frictional engagement with said annular friction surface, the helical friction section having a first end connected to said first rotary input and a second end connected to said rotary drive output, the helical friction coils of the friction spring section extending generally helically relative to said annular friction surface from said first end in an angular direction whereby upon relative rotation of the first rotary input ahead of the rotary drive output, the helical coils of the friction spring section are radially displaced into greater frictional engagement with the annular friction surface of the drum to provide a more effective friction coupling between the drum and the rotary drive output.

11. In a settable price variator drive train for a fluid delivery system having a variator settable for establishing at least in part the unit volume price of the fluid and comprising a rotary input adapted to be rotated in accordance with the volume of fluid delivered, a rotary output and gear means interconnecting the variator input and output having settable gear means settable for establishing the drive ratio therebetween for establishing at least in part the unit volume price of the fluid, and a rotary drive mechanism driven by the variator for connecting the variator for registering the cost of fluid delivered in accordance with the volume of fluid delivered and the drive ratio setting of the variator, the improvement wherein the rotary drive mechanism comprises a dual input rotary drive mechanism with first and second rotary inputs respectively operatively connected to be driven by the variator output and by the variator input bypassing said settable gear means, a rotary drive output and intermediate means interconnecting said first and second inputs and said drive output for coupling said second rotary input for at least in part driving said rotary drive output whereby at least part of the torque load on said rotary drive output is transmitted from said variator input via said second rotary input bypassing said settable gear means.

12. A settable price variator drive train according to claim 11 wherein the intermediate means comprises rotary coupling means between said first rotary input and said rotary drive output permitting relative angular rotation thereof and operative in accordance with said relative angular rotation to selectively couple said second rotary input to said rotary drive output.

13. In a settable variator drive train for driving associated mechanism comprising a variator with a rotary input, a rotary output, and gear means interconnecting the variator input and output having settable gear means settable for establishing the drive ratio therebetween, and a rotary drive mechanism driven by the variator and having a rotary drive output for driving the associated mechanism, the improvement wherein said rotary drive mechanism comprises first and second rotary inputs respectively connected for being driven by said variator output and by the variator input bypassing the settable gear means, and intermediate drive control means interconnecting said first and second inputs and said rotary drive output for selectively coupling said second rotary input for rotating said rotary drive output in accordance with the rotation of said first output whereby at least part of the torque load on said rotary drive output is transmitted thereto from the variator input and via said second input bypassing the settable gear means.

14. In a settable price variator drive mechanism for a fluid delivery system for setting the unit volume price of the fluid delivered comprising a variator with a rotary input adapted to be rotated in accordance with the volume of fluid delivered, a rotary output, and gear means with backlash interconnecting the variator input and output comprising settable price gear means settable for establishing the drive ratio therebetween for establishing the unit volume price of the fluid and for rotating the variator output in accordance with the cost of fluid delivered, and a rotary drive mechanism having a rotary drive output driven in accordance with the rotation of the variator output and adapted for being connected for registering the cost of fluid delivered, the improvement wherein said rotary drive mechanism comprises auxiliary rotary drive means operable separately from the variator gear means and coupling means coupling said auxiliary rotary drive means to said rotary drive output and said variator output for driving the rotary drive output in accordance with the rotation of the variator output and for back driving the variator output and at least part of the variator gear means at least above some predetermined speed of the variator output to at least partly eliminate overtravel backlash in the variator gear means above said predetermined speed.

15. A settable price variator drive mechanism according to claim 14 wherein the coupling means couples said auxiliary rotary drive means to the variator output for back driving the variator output and variator gear means to eliminate overtravel backlash in the variator gear means.

* * * * *